(12) United States Patent
Khamesra et al.

(10) Patent No.: US 10,990,560 B2
(45) Date of Patent: *Apr. 27, 2021

(54) USB TYPE-C SIDEBAND SIGNAL INTERFACE CIRCUIT

(71) Applicant: Cypress Semiconductor Corporation, San Jose, CA (US)

(72) Inventors: Arun Khamesra, Bangalore (IN); Anup Nayak, Fremont, CA (US); Partha Mondal, Paschim Medinipur (IN); Hemant Prakash Vispute, Bangalore (IN); Ravi Konduru, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/415,116

(22) Filed: May 17, 2019

(65) Prior Publication Data

US 2019/0391950 A1 Dec. 26, 2019

Related U.S. Application Data

(63) Continuation of application No. 16/000,733, filed on Jun. 5, 2018, now Pat. No. 10,353,853.

(Continued)

(51) Int. Cl.
*G06F 13/42* (2006.01)
*G06F 13/362* (2006.01)
(Continued)

(52) U.S. Cl.
CPC ........ *G06F 13/4282* (2013.01); *G06F 13/362* (2013.01); *G06F 13/385* (2013.01); *G06F 13/4068* (2013.01)

(58) Field of Classification Search
CPC .... G06F 13/4282; G06F 13/385; G06F 1/266; G06F 13/4022; G06F 1/3287; G06F 13/362; G06F 13/4068
(Continued)

(56) References Cited

U.S. PATENT DOCUMENTS 9,680,474 B1 6/2017 Kandala et al.
9,837,144 B1 12/2017 Sinha et al.
(Continued)

FOREIGN PATENT DOCUMENTS

| CN | 105954644 A | 9/2016 |
|---|---|---|
| CN | 106300314 A | 1/2017 |
| CN | 107544934 A | 1/2018 |

OTHER PUBLICATIONS

Gayathri Vasudevan, Designing USB 3.1 Type-C Cables Using EZ-PD™ CCG2, Cypress Semiconductor, Apr. 12, 2015; 22 pages.

(Continued)

*Primary Examiner* — Faisal M Zaman

(57) ABSTRACT

A USB-C controller, disposed on an integrated circuit (IC), comprises a first pair of terminals to communicate with a first communication protocol that is other than USB, a second pair of terminals to communicate with a second communication protocol that is other than USB, and a third pair of terminals, each of which is to be coupled to a corresponding SBU1 terminal or SBU2 terminal of a Type-C receptacle. The USB-C controller further includes: a multiplexer to selectively couple the first pair of terminals to the third pair of terminals and the second pair of terminals to the third pair of terminals: and logic to control the multiplexer according to a mode enabled within a configuration channel (CC) signal.

20 Claims, 14 Drawing Sheets

Related U.S. Application Data

(60) Provisional application No. 62/656,284, filed on Apr. 11, 2018.

(51) Int. Cl.
*G06F 13/40* (2006.01)
*G06F 13/38* (2006.01)

(58) Field of Classification Search
USPC .................................. 439/620.22; 710/313
See application file for complete search history.

(56) References Cited

U.S. PATENT DOCUMENTS

| | | | |
|---|---|---|---|
| 9,934,176 B2 | 4/2018 | Wang et al. | |
| 10,353,853 B1* | 7/2019 | Khamesra | G06F 13/4282 |
| 2003/0001080 A1 | 1/2003 | Kummaraguntla et al. | |
| 2003/0117756 A1 | 6/2003 | Chih | |
| 2004/0165410 A1 | 8/2004 | Chevallier | |
| 2013/0249514 A1 | 9/2013 | Huang et al. | |
| 2016/0156137 A1* | 6/2016 | Pan | G06F 13/385 439/78 |
| 2016/0170932 A1 | 6/2016 | Lin | |
| 2016/0190794 A1 | 6/2016 | Forghani-zadeh et al. | |
| 2016/0253283 A1* | 9/2016 | Bowers | G06F 13/4068 710/305 |
| 2016/0259005 A1* | 9/2016 | Menon | G01R 31/31705 |
| 2016/0285757 A1* | 9/2016 | Srivastava | H04L 12/10 |
| 2016/0378971 A1* | 12/2016 | Dunstan | G06F 13/102 726/17 |
| 2017/0039153 A1 | 2/2017 | Chen et al. | |
| 2017/0124016 A1 | 5/2017 | Gerber et al. | |
| 2017/0155214 A1 | 6/2017 | Shen et al. | |
| 2017/0161226 A1 | 6/2017 | Gerber et al. | |
| 2017/0242804 A1 | 8/2017 | Voor et al. | |
| 2017/0277650 A1 | 9/2017 | Zhao et al. | |
| 2017/0293335 A1 | 10/2017 | Dunstan et al. | |
| 2017/0344508 A1 | 11/2017 | Setiawan et al. | |
| 2018/0018934 A1 | 1/2018 | Lim et al. | |
| 2018/0027320 A1 | 1/2018 | Liu et al. | |
| 2018/0060270 A1 | 3/2018 | Schnell et al. | |
| 2018/0106834 A1* | 4/2018 | Liu | G01R 1/0416 |
| 2018/0292880 A1* | 10/2018 | Nakadokoro | G06F 1/266 |
| 2019/0110119 A1* | 4/2019 | Yoshino | H01Q 1/46 |

OTHER PUBLICATIONS

International Search Report for International application No. PCT/US2019/026458 dated May 14, 2019, 2 pages.

TPD6S300 USB Type-C Port Protector_Short-to-VBUS Overvoltage and IEC ESD Protection, Texas Instruments, Jan. 2017; 35 pages.

TPD8S300 USB Type-C Port Protector_Short-to-VBUS Overvoltage and IEC ESD Protection, Texas Instruments, Nov. 2016; 34 pages.

USPTO Applicant Initiated Interview Summary for U.S. Appl. No. 16/000,733 dated Jan. 17, 2019; 3 pages.

USPTO Non-Final Rejection for U.S. Appl. No. 16/000,733 dated Nov. 16, 2018; 7 pages.

USPTO Notice of Allowance for U.S. Appl. No. 16/000,733 dated Feb. 15, 2019; 7 pages.

Written Opinion of the International Searching Authority for International application No. PCT/US2019/026458 dated May 14, 2019, 5 pages.

* cited by examiner

USB TYPE-C SIDEBAND SIGNAL INTERFACE CIRCUIT

RELATED APPLICATIONS

The present application is a continuation application of U.S. Non-Provisional application Ser. No. 16/000,733, filed Jun. 5, 2018, which claims the priority and benefit under 35 U.S.C. § 119(e) of U.S. Provisional Application No. 62/656,284, filed on Apr. 11, 2018, all of which are incorporated by reference herein in their entirety.

TECHNICAL FIELD

The disclosure relates to the field of electronic circuits, in particular to a USB type-C sideband signal interface circuit.

BACKGROUND

Electronic circuits may include individual electronic components, such as resistors, transistors, capacitors, inductors, and diodes, among others, connected by conductive wires or traces through which electric current can flow. Electronic circuits may be constructed using discrete components, or more commonly integrated in an integrated circuit where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

A USB type-C receptacle, with capabilities of up-side down connection and accessible to external physical connectors, may access interface circuitry for reverse detection, multiplexers for flip correction, and IEC electrostatic discharge (ESD) protection. Sideband use (SBU) lines may be provided with additional short-circuit protection from accidental short to neighboring 20V VBUS terminal. There is presently no one-die solution (e.g., a single integrated circuit chip) for these capabilities. Accordingly, a hardware manufacture that incorporates USB technology may need to use external components for one or another capability, which may degrade the high-speed signaling and increase costs, for example.

In various embodiments, a device includes a USB-C controller instantiated as a first integrated circuit, e.g., implemented as an instance on a single integrated circuit. The USB-C controller may include a first pair of terminals coupled to a first host controller to communicate with a first communication protocol that is other than USB, a second pair of terminals coupled to a second host controller to communicate with a second communication protocol that is other than USB, and a third pair of terminals, each of which is to be coupled to a corresponding SBU1 terminal or SBU2 terminal of a type-C receptacle. The SBU terminals allow communication in alternate mode, e.g., with a protocol other than USB. The USB-C controller may further include a multiplexer to selectively couple the first pair of terminals to the third pair of terminals and the second pair of terminals to the third pair of terminals. The controller may further include a series of cascaded, low-voltage n-type field-effect transistors (LVNFETs) coupled between the multiplexer and each terminal of the third pair of terminals. When terminals are referred to herein, reference is understood to be made to integrated circuit terminals, metal lines, pins, and to other input/output connectors, depending on implementation.

Figure 1:
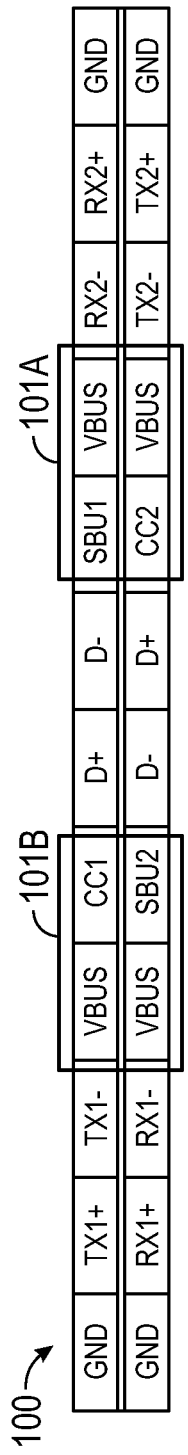
FIG. 1 is a block diagram of a USB type-C (USB-C) connector according an embodiment.

FIG. 1 is a block diagram of a USB type-C (USB-C) connector 100 according an embodiment. Many of the terminals on the USB-C connector 100 are replicated on the top and on the bottom so that the USB-C connector may fit into a USB-C receptacle right side up or up-side down and still function. Those familiar with the USB-C standard will recognize these terminals, and with particular reference to the present disclosure, the sideband use terminals (SBU1, SBU2) and the configuration channel terminals (CC1, CC2).

The SBU terminals may be for communicating with other-than-USB protocols in alternate mode, such as selected from a group of protocols, which include the DisplayPort (DP) protocol, high-definition multimedia interface (HDMI) protocol, the Thunderbolt® (TBT) protocol, the mobile high-definition link (MHL) protocol, and the Peripheral Component Interconnect Express (PCIe) protocol, and the like. The CC terminals may enable cable attach detection, cable orientation detection, role detection, and current-mode detection, e.g., standard mode or alternate mode. The unused CC terminal may become the VCONN terminal, which may supply power to USB-C controller chips in active cables or adaptors.

The VBUS terminals may be used for the cable bus power and are situated next to the SBU and CC terminals. For example, a first set of VBUS terminals are located adjacent the SBU1 and CC1 terminals (designated with box 101A)

and a second set of VBUS terminals are located adjacent the SBU2 and CC2 terminals (designated with box 101B). As the sidewalls between the VBUS terminals and the sets of SBU and CC terminals wear down, the risk of a short circuit therebetween increases, thus causing a fault. Accordingly, switching circuitry in a USB-C controller on the SBU lines is to consider short-circuit and IEC electrostatic discharge (ESD) protections as will be discussed in more detail. Additional terminals include ground terminals (GND), D+/D− terminals to communicate over postive and negative data lines (DP/DM lines), and USB 3.1 transceiver/receiver terminals (TX/RX).

With additional reference to FIG. 1, the position of the SBU1 terminal and the SBU2 terminal on the one hand, and the position of the CC1 terminal and the CC2 terminal on the other hand, may each be flipped between the top and the bottom of the USB-C receptacle. This is due to the USB Type-C specification definition a Type-C port, which may be associated with a Type-C plug or a Type-C receptacle. For ease of use, the Type-C plug and the Type-C receptacle are designed as a reversible pair that operates regardless of the plug-to-receptacle orientation. Accordingly, a USB-C controller may include multiplexing between top and bottom duplicate terminals depending on the orientation of the USB-C connector placed therein. Further, a configuration channel (CC) signal may be transmitted through either of the CC1 or the CC2 terminals, which may follow CC protocol for flip correction, so as to signal the multiplexers which set of terminals to select as will be discussed in detail.

Figure 2A:
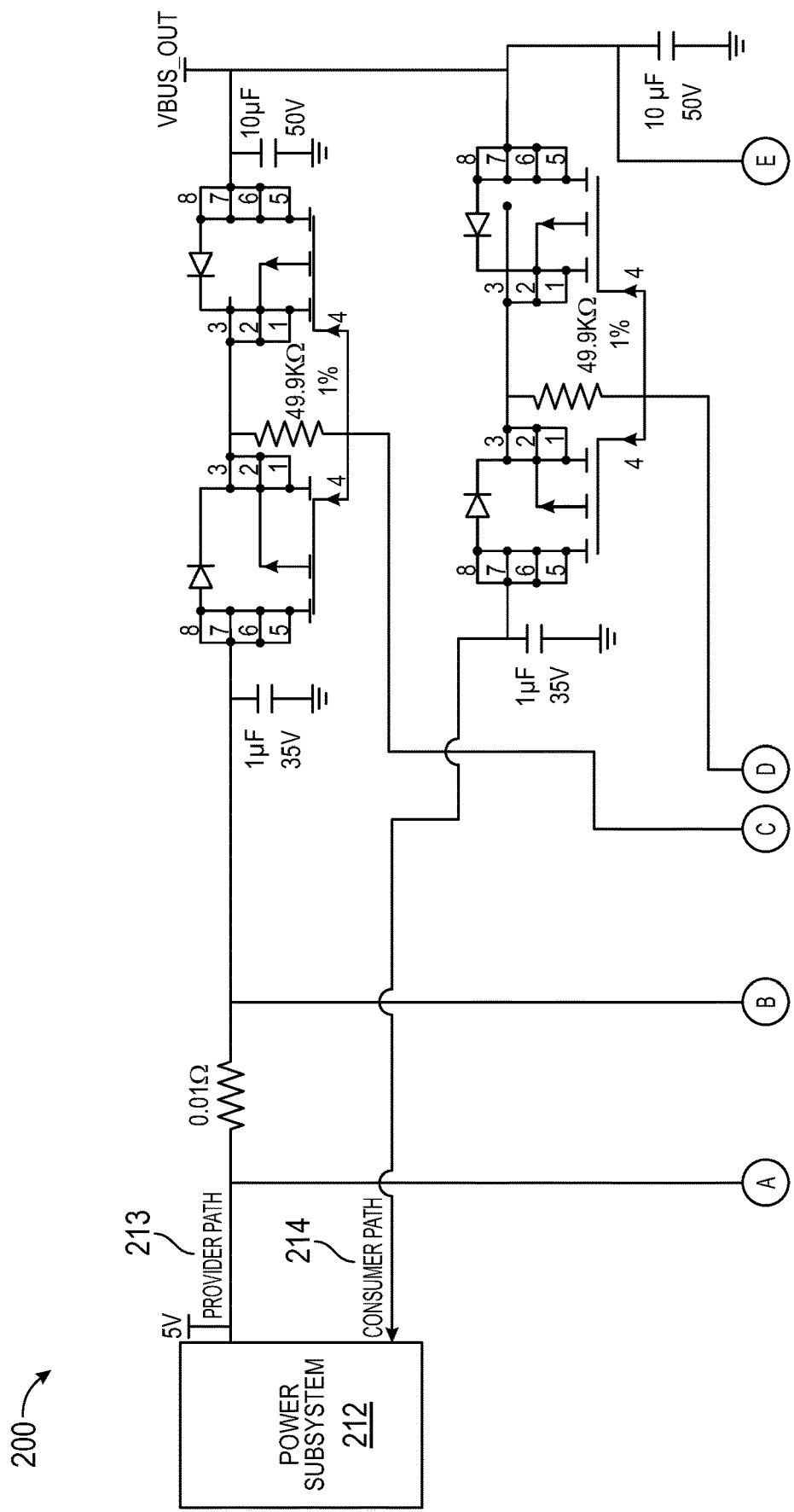
FIG. 2A, FIG. 2B, and FIG. 2C are portions of a circuit diagram of a single port Thunderbolt® (TBT) notebook power source/sink circuit, according to an embodiment.
Figure 2B:
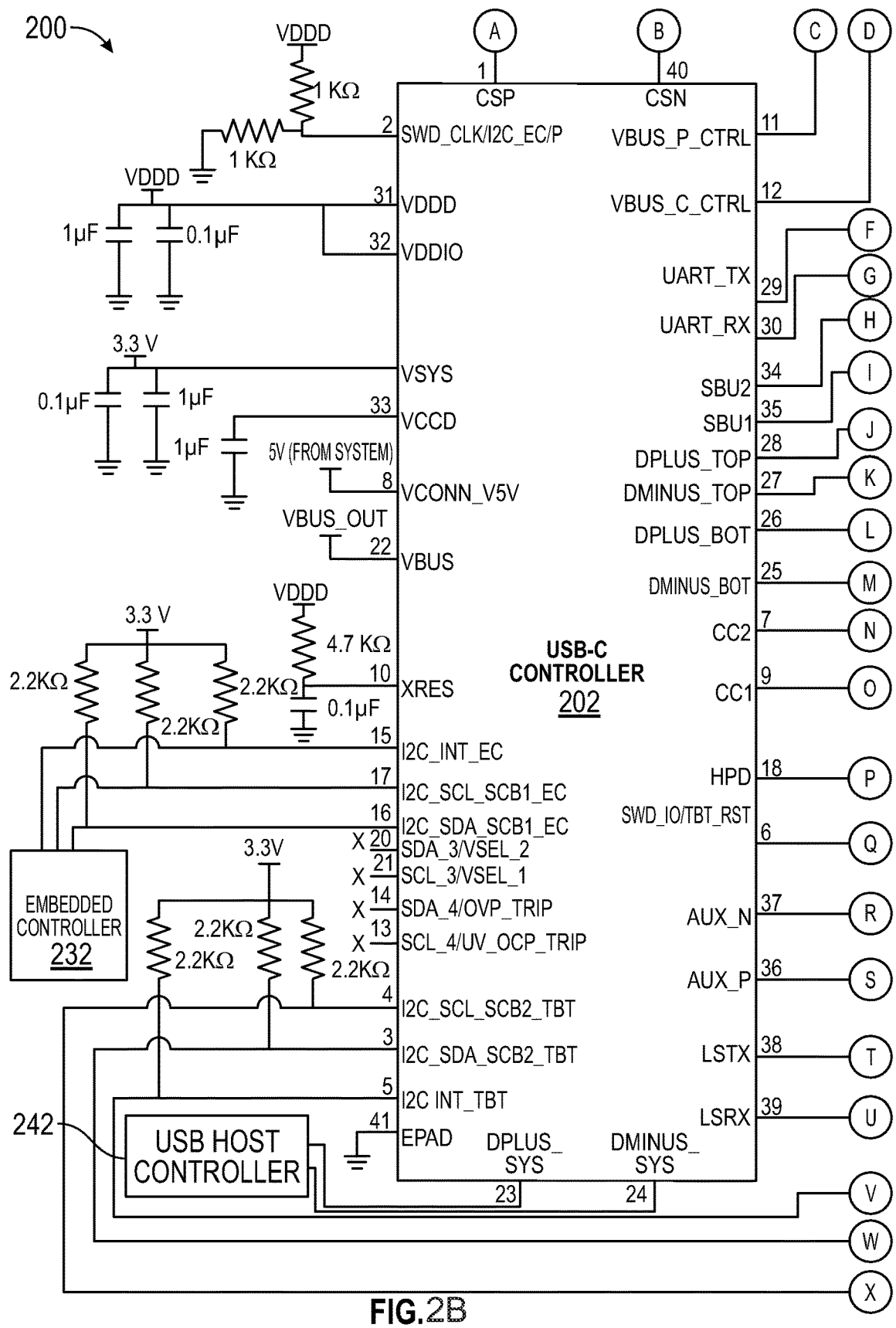
Figure 2C:
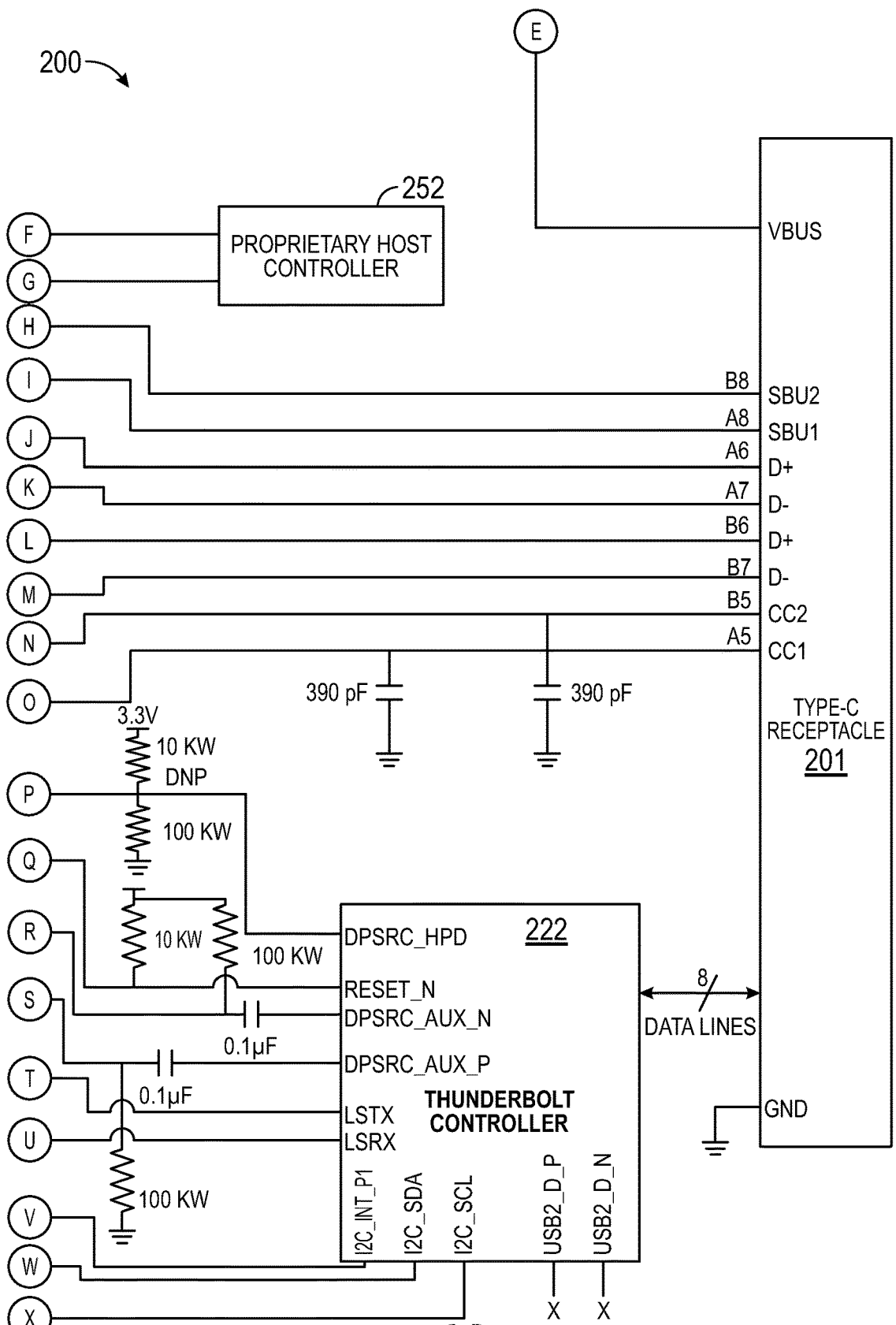

FIG. 2 is a circuit diagram of a single port Thunderbolt® (TBT) notebook power source/sink circuit 200, according to an embodiment, for system context of where the disclosed type-C sideband signal interface circuit may be employed. The type-C sideband signal interface circuit may also be employed in other USB type-C devices and systems. In embodiments, the circuit 200 may include a type-C receptacle 201, a USB-C controller 202, a power subsystem 212, a TBT controller 222, an embedded controller 232, a USB host controller 242, and a proprietary host controller 252. In embodiments, the disclosed type-C sideband signal interface circuit may be employed as a part of or integrated within the USB-C controller 202. The power subsystem 212 may provide a five volt (5V) provider path 213, to generate VBUS OUT for use by other USB-C circuitry, and a power consumer path 214 to power the power subsystem 212.

In various embodiments, the type-C receptacle 201 may contain terminals that correspond to the terminals of the USB-C connector 100 of FIG. 1, e.g., VBUS, SBU1, SBU2, D+/D− (top), D+/D− (bottom), CC2, CC1, and GND. These terminals may be coupled to corresponding terminals on the USB-C controller 202, respectively, the VBUS_C_CTRL, SBU2, SBU1, DPLUS_TOP, DMINUS_TOP, DPLU_BOT, DMINUS_BOT, CC2, and CC1 terminals. The USB-C controller 202 may be configured for alternate mode operation, which enables other communication protocols, which was just discussed.

As illustrated, the USB-C controller 202 may include a number of additional connections and circuitry, not all that are relevant here, and may be manufactured as a single integrated circuit. Note the additional negative auxiliary terminal (AUX_N), positive auxiliary terminal (AUX_P), TBT transmit control signal terminal (LSTX), and TBT receive control signal terminal (LSRX) on the USB-C controller 202 may be coupled to corresponding terminals on the TBT controller 222. The AUX_N, AUX_P terminals may provide auxiliary signals for DisplayPort signaling and the LSTX, LSRX terminals may provide TBT link management using Universal Asynchronous Receiver-Transmitter (UART)-based technology, for example. Furthermore, a positive data system terminal (e.g., DPLUS_SYS) and a negative data system terminal (e.g., DMINUS_SYS) of the USB-C controller 202 may be coupled to DP/DM system lines that are routed to the USB host controller 242. A data transmitter terminal (e.g., UART_TX) and a data receiver terminal (e.g., UART_RX) may be coupled to the proprietary host controller 252. The proprietary host controller 252 may be a proprietary controller such as a test and debug controller of a host computing system in which the circuit 200 is located, e.g, the notebook or other computing system that hosts the USB-C controller 202.

In various embodiments, the embedded controller 232 may be coupled to the USB-C controller 202 through, for example, an inter-integrated circuit connection (I2C), e.g., a synchronous, multi-master, multi-slave, packet switched, single-ended, or a serial computer bus. The USB-C controller 202 may include an I2C address that is determined by the SWD_CLK terminal.

The USB-C controller 202 may communicate with the power subsystem 212 over I2C, which manages the power provided to the upstream type-C ports. The USB-C controller 202 may also update the TBT controller 222 over I2C based on the alternate mode negotiation to sink Thunderbolt® or USB or DisplayPort protocol data. The USB-C controller 202 may control the transfer of USB 2.0 D+/D− lines from the top and bottom of the type-C receptacle 201 to the D+/D− lines of the TBT controller 222. The USB-C controller 202 may also handle the routing of SBU1 and SBU2 lines from the type-C receptacle 201 to the TBT controller 222 for the link management. In embodiments, the USB-C controller 202 may offer on-chip ESD protection on D+/D− and SBU lines as well as on-chip VBUS Short protection on SBU and CC lines. Some of these capabilities will be discussed in more detail below.

Figure 3:
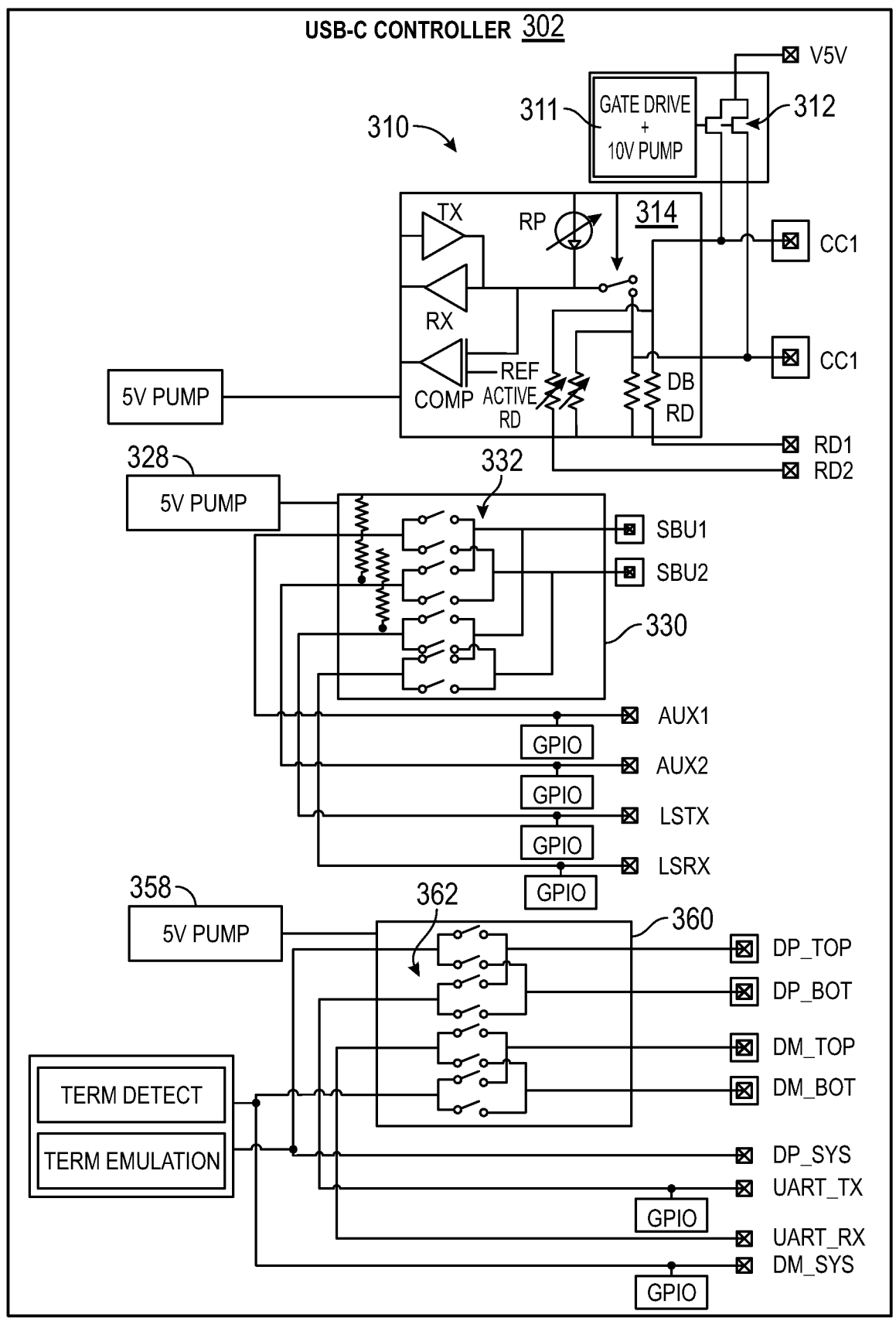
FIG. 3 is a circuit diagram of sub-portions of a USB-C controller according to an embodiment.

FIG. 3 is a circuit diagram of sub-portions of a USB-C controller 302, associated with a single port, according to an embodiment. In one embodiment, the USB-C controller 300 is the USB-C controller 202 of FIG. 2. The USB-C controller 302 may include a configuration channel (CC) interface circuit 310, a USB-C sideband signal interface circuit 330, and a USB-C D+/D− interface circuit 360.

In various embodiments, the CC interface circuit 310 may include a gate drive and 10V charge pump 311 and a pair of transistor switches 312 to enable VCONN functionality on CC1/CC2 depending on the connector direction. Either of CC1 or CC2 may be used for CC protocol and the other one may be connected to V5V using 312 switches to give power to the cable. The CC interface circuit 310 may further include reference circuitry 314 to compare and detect certain types of signals received through the CC1 and CC2 terminals, and to generate outgoing control signals over the CC1 and CC2 terminals.

In some embodiments, the USB-C sideband signal interface circuit 330 may include a four-by-two multiplexer 332 with resistance isolation on the inputs and having switches driven using a 5V charge pump 328. The four-by-two multiplexer 332 may selectively couple a first pair of terminals (e.g., AUX1, AUX2 terminals) to a pair of SBU terminals (e.g., SBU1, SBU2), and selectively couple a second pair of terminals (e.g., LSTX, LSRX terminals) to the pair of SBU terminals (e.g., SBU1, SBU2). The general purpose input/output (GPIO) boxes may be adapted to receive communication links of protocols other than USB. In one embodiment, the switches of the four-by-two multiplexer 332 are metal-oxide-semiconductor field-effect transistors (MOSFETs), e.g., specifically low-voltage n-type field effect transistors (LVNFETs). In one embodiment, the charge pump 328 may drive the gates of the LVNFETs such that the LVNFETs each operate in a linear region and exhibit less than a seven-ohm resistance.

The LVNFETs may be "low-voltage" in the sense of operating at the full operating voltage of the device (e.g., that includes the USB-C controller 302), as provided by the power subsystem 212. In some embodiments, this full operating voltage may be 5V, in another embodiment it is 3.3V, or another voltage that may be about 5V or less.

In some embodiments, a USB-C D+/D− interface circuit 360 may include a four-by-four multiplexer 362 that includes switches that are also driven by a 5V charge pump 358. The four-by-four multiplexer 362 may selectively couple the positive data system terminal (DP_SYS) to one of the first and second positive data terminals (DP_TOP, DP_BOT), the data transmitter terminal (UART_TX) to one of the first and second positive data terminals (DP_TOP, DP_BOT), the negative data system terminal (DM_SYS) to one of the first and second negative data terminals (DM_TOP, DM_BOT), and the data receiver terminal (UART_RX) to one of the first and second negative data terminals (DM_TOP, DM_BOT).

In one embodiment, the switches of the four-by-four multiplexer 362 are MOSFETs, e.g., specifically n-type field effect transistors (NFETs). The 5V charge pump 528 may be a low-ripple charge pump (e.g., low-ripple 5V charge pump) coupled to gates of the MOSFETs of the four-by-four multiplexer 362. The low-ripple charge pump may drive the MOSFETs to operate in a linear region and such that each MOSFET exhibits less than seven-ohm resistance.

In embodiments, the high-speed operation of the disclosed USB-C controllers may meet USB2.0 high-speed data rates with signaling rates of 480 Mbps, USB2.0 full-speed data rates with signaling rates of 12 Mbps, may provide UART signaling, and provide access to a battery charger for USB devices.

Figure 4A:
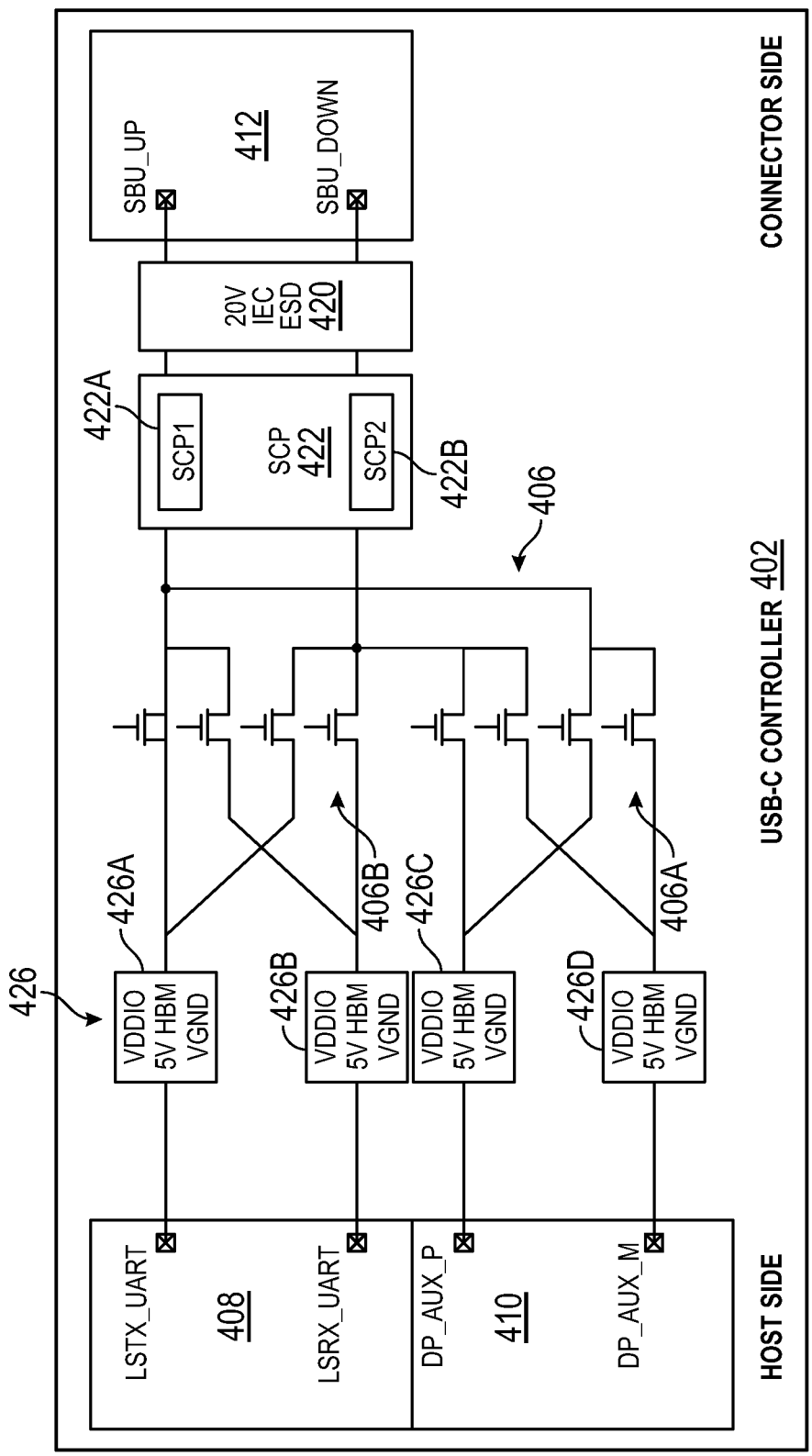
FIG. 4A is a circuit diagram illustrating a USB-C controller that integrates a USB type-C sideband signal interface according to another embodiment.

FIG. 4A is a circuit diagram illustrating a USB-C controller 402 that integrates a USB type-C sideband signal interface according to another embodiment. In one embodiment, the USB-C controller 402 is the USB-C controller 202 of FIG. 2 or the USB-C controller 302 of FIG. 3, and thus may be viewed as a part of the circuits of these Figures.

For example, the USB-C controller 402 may further include, on the host side, a first pair of terminals 408, including a data transmitter terminal (LSTX_UART) and data receiver terminal (LSRX_UART), e.g., to be coupled to the TBT controller 222 for communication with the TBT protocol. The USB-C controller 402 may further include, on the host side, the second pair of terminals 410, including a positive auxiliary terminal (DP_AUX_P) and a negative auxiliary terminal (DP_AUX_M), e.g., to be coupled to the TBT controller 222 for communication with the DisplayPort (DP) protocol according to the circuit 200 of FIG. 2. The TBT controller 222 may be a first host controller, and in another embodiment, the auxiliary terminals may be coupled to a second host controller different than the TBT controller 222, to provide flexibility in choice of alternate mode communication.

In embodiments, the USB-C controller 402 may further include, on the connector side, a third pair of terminals 412, each of which is to be coupled to a corresponding SBU1 terminal or SBU2 terminal of the type-C receptable 201 (FIG. 1). Accordingly, the third pair of terminals may be a sideband use up terminal (SBU_UP) and a sideband use down terminal (SBU_DOWN), which terminals are respectively referred to as SBU1 and SBU2 in the USB-C controller 202 of FIG. 2.

In various embodiments, the USB-C controller 402 may further include a multiplexer 406 (e.g., a four-by-two multipler), which may be made up of multiple low-voltage n-type field effect transistors (LVNFETs). For example, the multiplexer 406 may include a first set of four LVNFETs 406A and a second set of four LVNFETs 406B. The multiplexer 406 may selectively couple the first pair of terminals 408 to the third pair of terminals 412 and the second pair of terminals 410 to the third pair of terminals 412 in a way that enables flip correction between top and bottom terminals of the USB-C connector 100.

More specifically, the first set of LVNVFETs 406A may couple the data transmitter terminal and the data receiver terminal to one of the SBU_UP terminal or the SBU_DOWN terminals, to provide flip correction in response to a configuration channel (CC) signal. Furthermore, the second set of LVNVFETs 406B may couple the positive auxiliary terminal and the negative auxiliary terminal to one of the SBU_UP terminal or the SBU_DOWN terminal, to provide flip correction in response to the CC signal. In some embodiments, the data transmitter terminal may be a LSTX control terminal and the data receiver terminal may be a LSRX control terminal of the TBT protocol and the positive auxiliary terminal and the negative auxiliary terminal are control terminals of the DP protocol. Other protocols are envisioned as are coupling to different host controllers to support those other protocols. In this way, the multiplexer 406 may enable choice, based on the CC signal through one of the CC1 or CC2 terminals, of one or another possible communication protocol to use in alternate mode.

The USB-C controller 402 may further include an IEC electrostatic discharge (ESD) protection circuit 420 coupled between the multiplexer 406 and the third set of terminals 412, e.g., the SBU_UP and SBU_DOWN terminals. The 20V IEC ESD protection circuit 420, which will be discussed in detail with reference to FIG. 4C, may provide ±8 KV of contact discharge protection and ±15 KV of air gap discharge protection based on IEC61000-4-2 level 4C protection. The 20V IEC ESD protection circuit 420 may protect against electrostatic discharge and provide better signal integrity for high-speed signals, and avoid extra routing at board level, which would otherwise be required if located on a second integrated circuit chip from the chip on which the multiplexer 406 is disposed.

In various embodiments, the USB-C controller 402 may further include a short-circuit protection (SCP) circuit 422, e.g., a first SCP circuit 422A and a second SCP circuit 422B. The first SCP circuit 422A may be coupled to the SBU_UP terminal and the second SCP circuit 422B may be coupled to the SBU_DOWN terminal, of the third pair of terminals 412. The first SCP circuit 422A and second SCP circuit 422B may be identical, and will be discussed with reference to FIG. 4B. Note that, in alternate embodiments, locations of the 20V IEC ESD protection circuit 420 and the SCP circuit 422 may be swapped from that which is illustrated in FIG. 4A.

In some embodiments, the USB-C controller 402 further includes additional ESD protection circuitry 426 coupled to the host (or system) side of the multiplexer 406. The additional ESD protection circuitry 426 may include first ESD protection circuitry 426A, second ESD protection circuitry 426B, third ESD protection circuitry 426C, and fourth system ESD protection circuitry 426D. The 20V IEC ESD protection circuit 420 and the additional ESD protection circuitry 526 may provide ESD clamp protection.

Figure 4B:
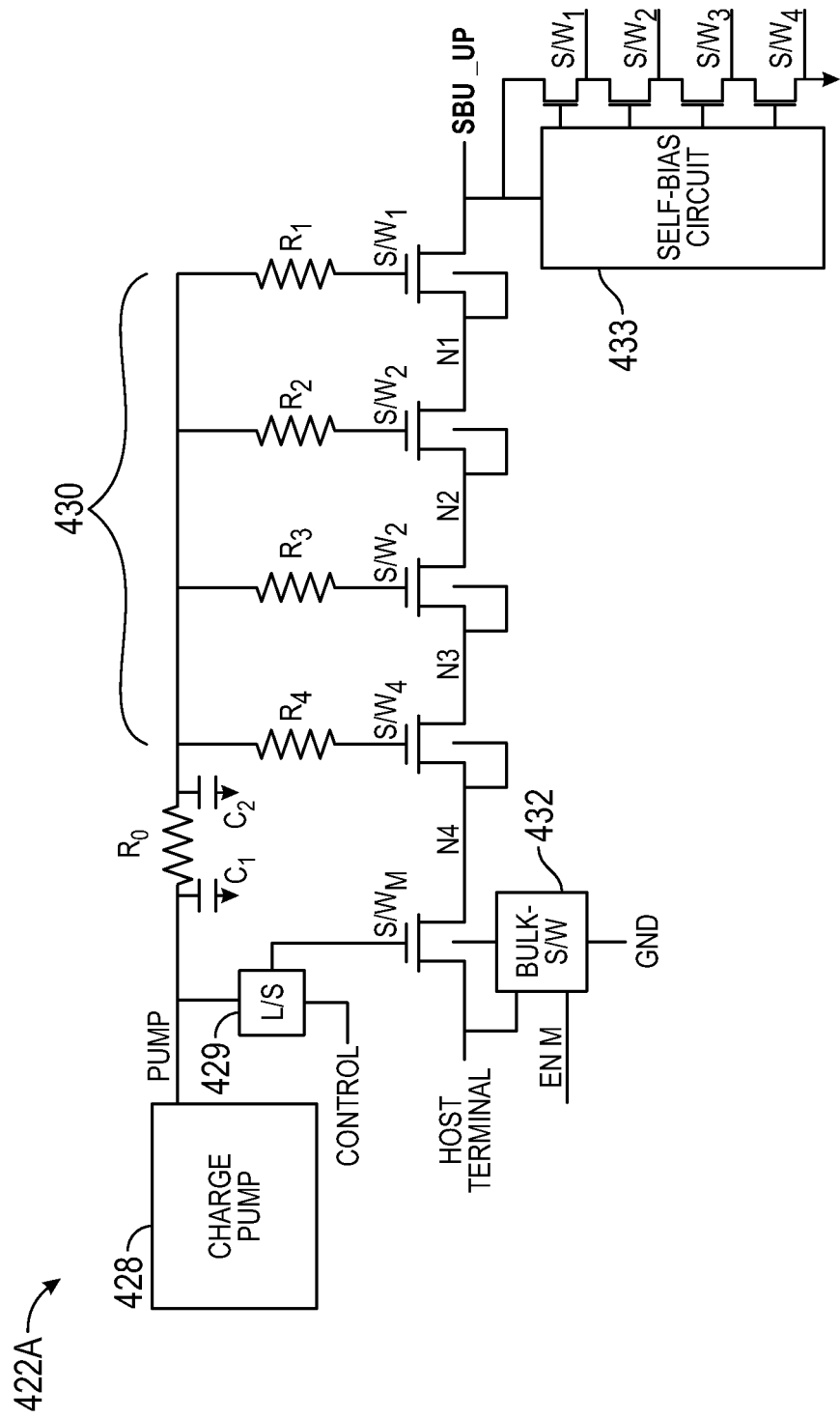
FIG. 4B is a circuit diagram illustrating a short circuit protection circuit of the USB-C controller of FIG. 4A according to an embodiment.

FIG. 4B is a circuit diagram illustrating the first short circuit protection (SCP) circuit 422A of the USB-C controller 402 of FIG. 4A according to an embodiment. As the first SCP circuit 422A and the second SCP circuit 422B are identical, the first SCP circuit 422A is exemplary and is illustrated and discussed. Accordingly, the host terminal illustrated in FIG. 4B may be any one of the first and second sets of terminals 410 and 412, as any one of these terminals may be coupled to the first SCP circuit 422A depending on a state of the multiplexer 406. Furthermore, the LVNFET labeled as $S/W_M$ for "multiplexer switch" may represent any of the four LVNFETs of the multiplexer 406 that are coupled to the SBU_UP terminal.

In various embodiments, the first SCP circuit 422A may include a charge pump 428 (e.g., a 5V charge pump), a level shifter 429, a series of cascaded LVNFETs 430 having gates driven by the charge pump 428, and a bulk set of switches 432 (which may include firmware, state machine, or other logic) to selectively control the LVNFET switches of the multiplexer 406 based on an enabled mode signal (EN_M). The enabled mode signal may be or respond to the CC signal from one of the CC1 or CC2 terminals. The level shifter 429 may convert, based on an input control signal, the voltage from the charge pump 428 to a voltage level appropriate for the gate of the $S/W_M$ LVNFET, e.g., the multiplexer LVNFET gate ("M" being for multiplexer).

With continued reference to FIG. 4B, the bulk set of switches 432 may switch the bulk connection of the $S/W_M$ transistor between GND and the source of the $S/W_M$ transistor based on the EN_M signal. This is done to avoid forward bias diode path from the host terminal to the SBU_UP terminal for the case when the host terminal is more than the signal on the SBU_UP terminal by one diode drop. Furthermore, use of the charge pump 428 to drive the gates of the LVNFETs may cause the LVNFETs (of the multiplexer 406 and of the series of cascaded LVNFETs 430) to operate in a linear region and exhibit less than seven-ohm resistance.

In embodiments, the first SCP circuit 422A may further include a first capacitor ($C_1$), a rail resistor ($R_0$), and a second capacitor ($C_2$) connected in series and coupled between the charge pump 428 and each of the gates of the series of cascaded LVNFETs 430. The series of LVNETs 430 may provide isolation to avoid cross-talk issues between LSTX and LSRX terminals due to non-differential signaling. Furthermore, the SCP circuit 422A may include a series of resistors ($R_1$, $R_2$, $R_3$, $R_4$) coupled between the gate of respective LVNFET of the series of cascaded LVNFETs 430 and the second capacitor.

In one embodiment, the series of cascaded LVNFETs 430 is a series of four cascaded LVNFETs, where the LVNEFTs of the multiplexer 406 and of the series of at least four cascaded LVNFETs are five-volt LVNFETs and provide at least 20 volts of short-circuit protection to circuitry of the USB-C controller 402 and host computing device. In an alternative embodiment, the series of cascaded LVNFETs 430 is a series of at least seven cascaded LVNFETs, where the LVNEFTs of the multiplexer 406 and the series of seven cascaded LVNFETs are three-volt LVNFETs and provide at least 20 volts of short-circuit protection to circuitry of the USB-C controller and host computing device.

In embodiments of normal operation (e.g., no VBUS short to SBU_UP), the voltages of the gates of the switches ($S/W_1$, $S/W_2$, $S/W_3$, and $S/W_4$) of the at least four cascaded LVNEFTs 430 are the same as the pump voltage of the charge pump 428, e.g., 5V. In such normal operation, when the enable mode line (EN_M) to the bulk set of switches 432 is low, the gate of the fifth switch ($S/M_M$) is at zero volts and no voltage signal is passed between the host terminal (e.g., LSTX or AUX pin) and the SBU_UP terminal. When the enable mode (EN_M) goes high and the all the switches (including the fifth switch) are at the pump voltage (e.g., 5V), then the voltage signal on the host terminal equals that of the SBU_UP voltage, whether low or high.

In an additional embodiment, the SCP circuit 422A may further include a self-bias circuit 433 coupled to the SBU_UP terminal to generate self-biased voltages on gates of the at least four LVNFETS 430, e.g., $S/W_1$, $S/W_2$, $S/W_3$, and $S/W_4$, in the case the 20V VBUS is shorted to the SBU_UP terminal. The voltage level of this self-biased voltage on each switch is illustrated in Table 1.

TABLE 1

| | | |
|---|---|---|
| $S/W_1$ | 16 V | 80% of VBUS |
| $S/W_2$ | 12 V | 60% of VBUS |
| $S/W_3$ | 8 V | 40% of VBUS |
| $S/W_4$ | 4 V | 20% of VBUS |

Note that the voltage on the gate of each of the at least four LVNFETS 430 is the highest on the first switch ($S/W_1$) nearest the SBU_UP terminal at 16V, and progressively decreases with each switch (12V on $S/W_2$, 8V on $S/W_3$, and 4V on $S/W_4$) moving away from the SBU_UP terminal. In the case of a short on one or both of the SBU terminals, the fifth switch ($S/W_M$) is turned off and goes to zero volts. Additionally, the pump signal is also pulled to zero volts. Furthermore, the resistances of each of the series of resistors ($R_1$, $R_2$, $R_3$, $R_4$) enables the bias voltage at the gate of each of the LVNFET switches to be higher (at the self-biased voltage) while the pump voltage is kept at zero voltage, thus providing for resistance isolation during a short circuit.

Figure 4C:
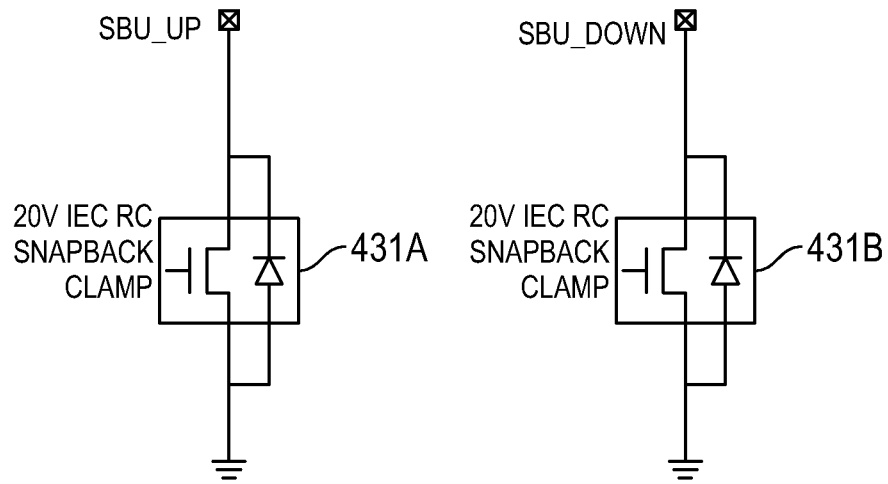
FIG. 4C is a circuit diagram of an IEC electrostatic discharge (ESD) protection circuit of the USB-C controller of FIG. 4A according an embodiment.

FIG. 4C is a circuit diagram of the 20V IEC electrostatic discharge (ESD) protection circuit 420 of the USB-C controller of FIG. 4A according an embodiment. In this embodiment, the 20V ESD protection circuit 420 includes a 20V IEC RC snapback clamp 431A and 431B coupled between each of the third pair of terminals (e.g., each of SBU_UP and SBU_DOWN), respectively, and ground.

Figure 4D:
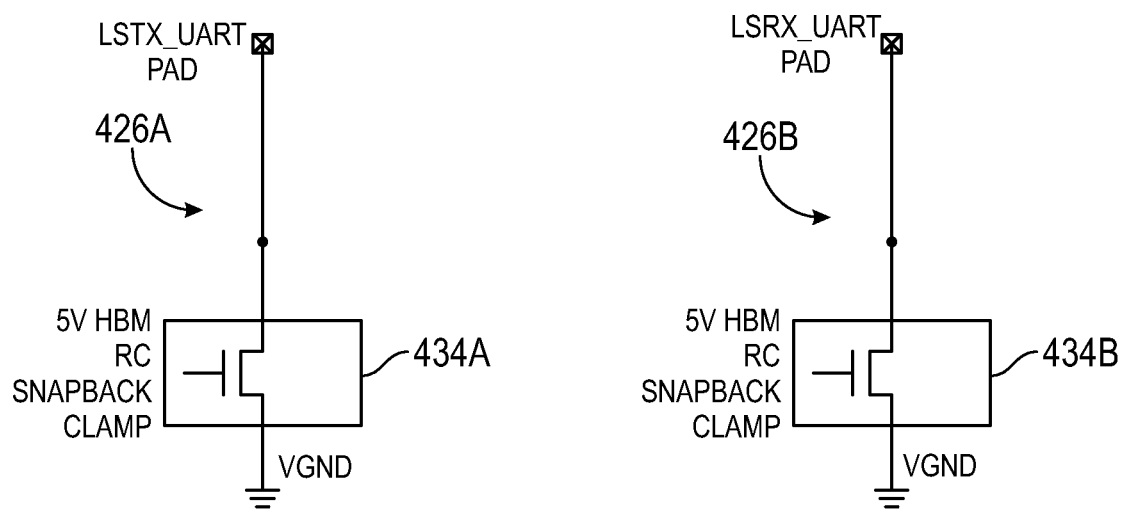
FIG. 4D and FIG. 4E are circuit diagrams of additional ESD protection circuitry on the system side of the USB-C controller of FIG. 4A according to an embodiment.
Figure 4E:
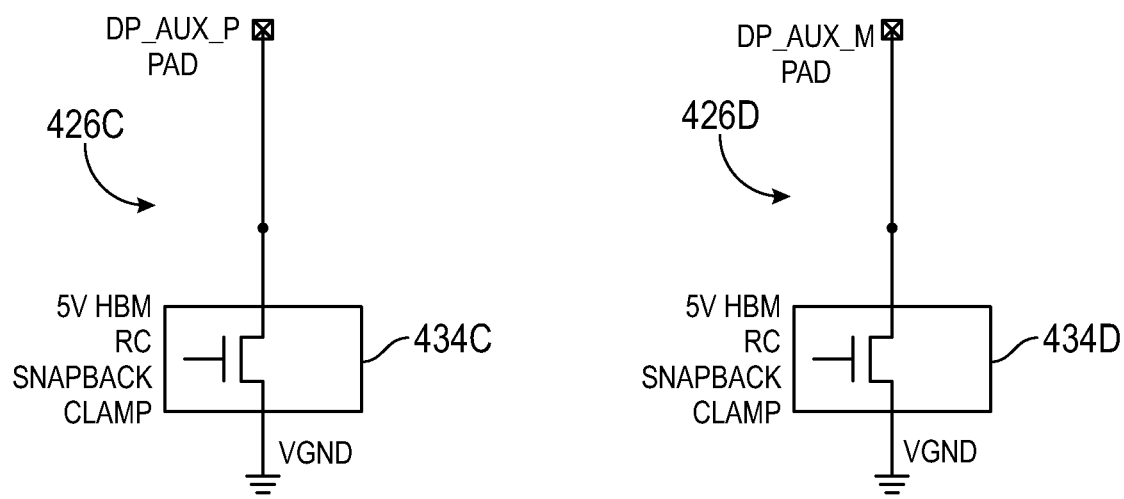

FIG. 4D and FIG. 4E are circuit diagrams of additional ESD protection circuitry on the system side of the USB-C controller of FIG. 4A according to an embodiment. In various embodiments, the additional ESD protection circuitry includes additional system ESD protection circuitry for each of the first set of terminals 410 coupled to the host controllers, e.g., for each of the data transmitter terminal (LSTX_UART) and the data receiver terminal (LSRX_UART) and for each of the second set of terminals 412, e.g., for each of the positive auxiliary terminal (DP_AUX_P) and the negative auxiliary terminal (DP_AUX_M).

More specifically, with reference to FIG. 4D, the first system ESD protection circuitry 426A may include a first human body model (HBM) snapback clamp 434A coupled to a ground and the data transmitter terminal (LSTX_UART). Further, the second system ESD protection circuitry 426B may include a second HBM snapback clamp 434B coupled to the ground and the data receiver terminal (LSRX_UART).

With additional reference to FIG. 4E, the third system ESD protection circuitry 426C may include a third HBM snapback clamp 434C coupled to the ground and the positive auxiliary terminal (DP_AUX_P). Further, the fourth system ESD protection circuitry 426D may include a fourth HBM snapback clamp 434D coupled to the ground and the negative auxiliary terminal (DP_AUX_M).

Figure 5A:
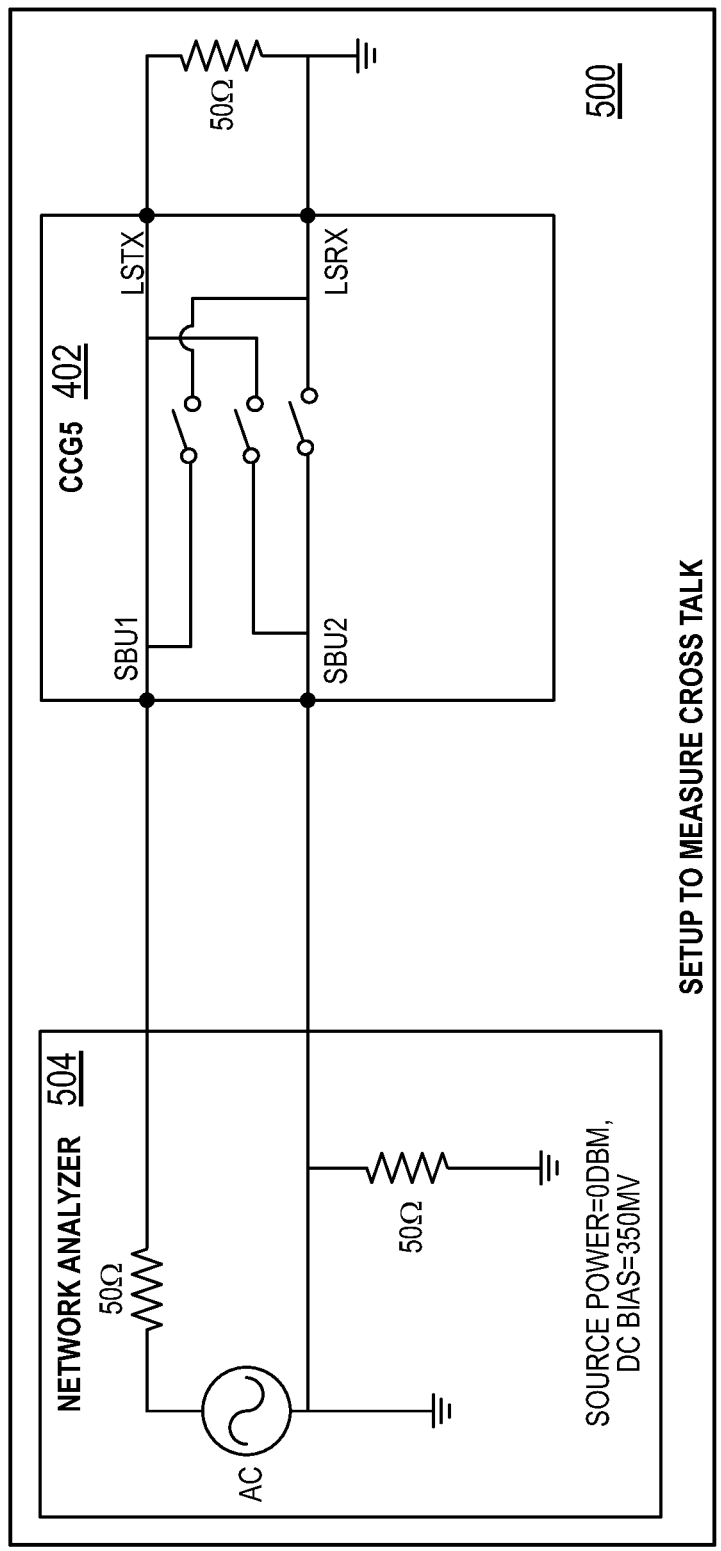
FIG. 5A is a circuit diagram of a test setup to measure a crosstalk parameter, and thus a level of isolation, between TBT transmit and receive control terminals (LSTX and LSRX) and sideband use terminals across the multiplexer of the USB-C controller of FIG. 4A according to an embodiment.

FIG. 5A is a circuit diagram of a test setup 500 to measure a crosstalk parameter, and thus a level of isolation, between TBT transmit and receive control terminals (LSTX and LSRX) and sideband use terminals (SBU1 and SBU2) across the multiplexer 406 of the USB-C controller 402 of FIG. 4A according to an embodiment. The test setup 500 may include a 50-ohm resistor connected across the LSTX and LSRX terminals on the outputs of the USB-C controller 402 and a network analyzer 504 connected across the SBU1 and SBU2 output terminals of the USB-C controller 402.

Figure 5B:
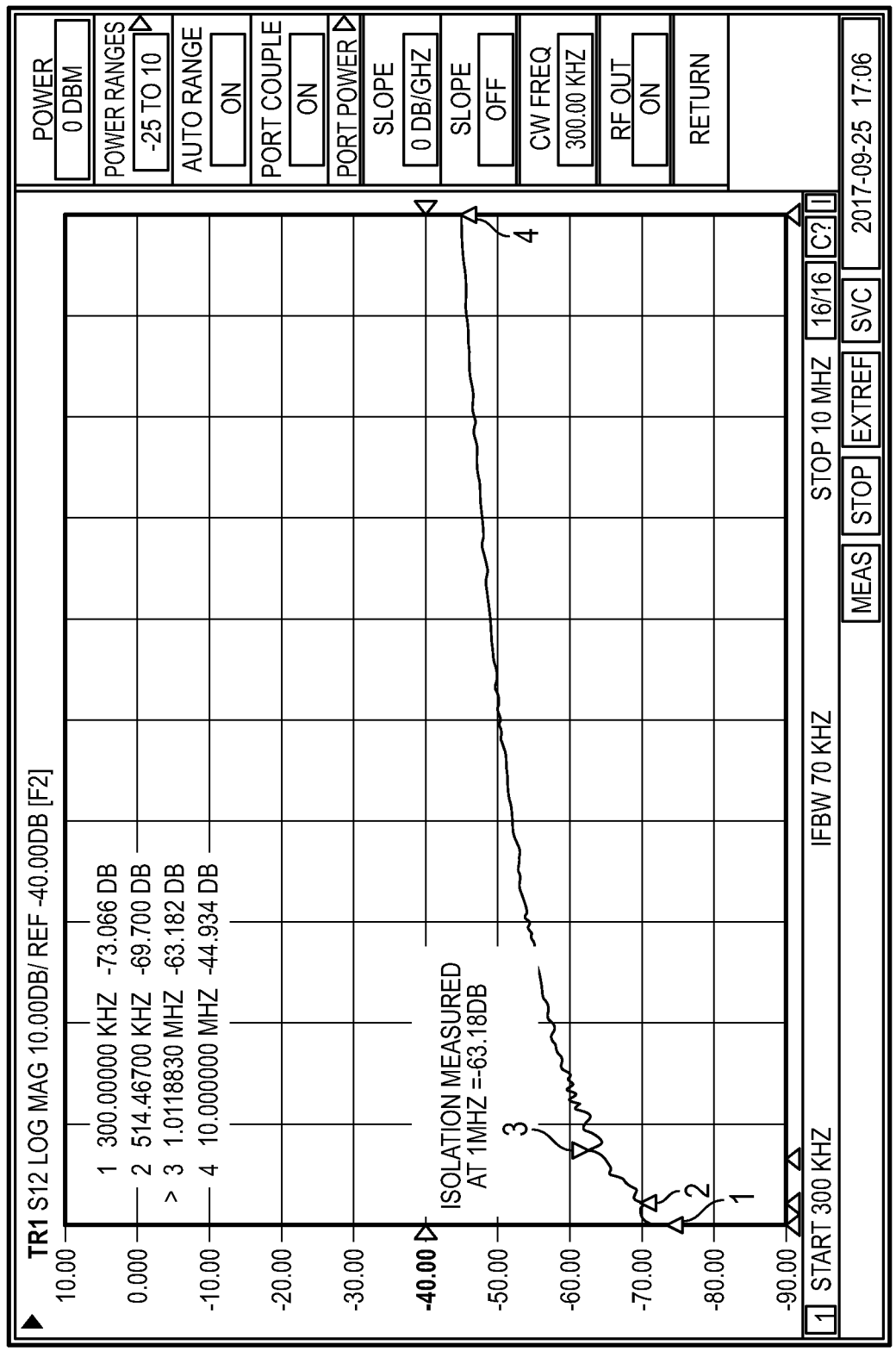
FIG. 5B is a graph illustrating results of the tests of FIG. 5A according to an embodiment.

FIG. 5B is a graph illustrating results of the tests of FIG. 5A according to an embodiment. Note the isolation measured at 1 MHz was −63.18 decibel (DB), which is minimal crosstalk. Other measurements are illustrated inset within the graph of FIG. 5B.

Figure 6A:
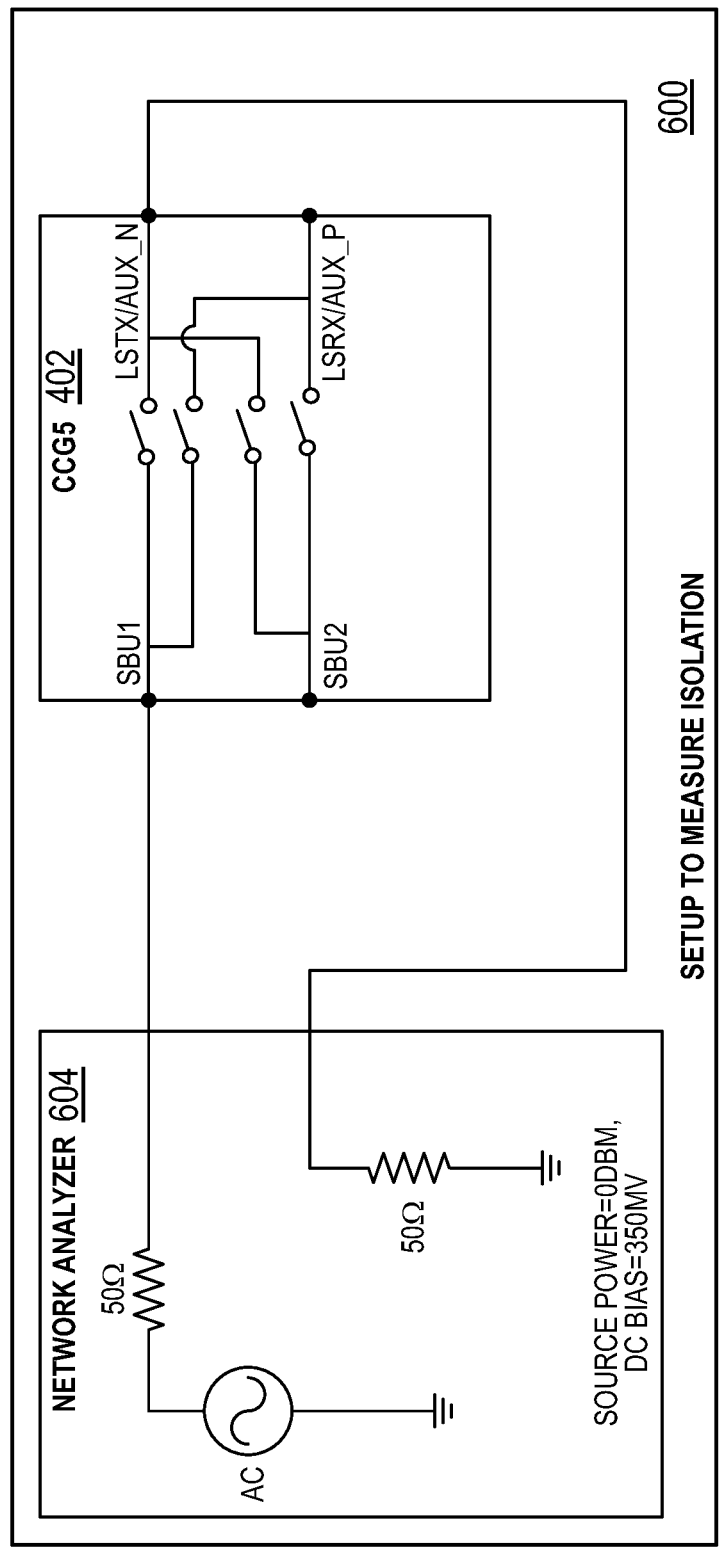
FIG. 6A is a circuit diagram of a test setup to measure an isolation parameter as to isolation between negative auxiliary terminal (AUX_N) and first sideband use terminal (SBU1) through the multiplexer of the USB-C controller of FIG. 4A according to an embodiment.

FIG. 6A is a circuit diagram of a test setup 600 to measure an isolation parameter as to isolation between negative auxiliary terminal (AUX_N) and first sideband use terminal (SBU1) through the multiplexer 406 of the USB-C controller of FIG. 4A according to an embodiment. The test setup 600 may include a network analyzer 604 connected between the LSTX or the AUX_N terminal and the SBU1 terminal of the USB-C controller 402 of FIG. 4A.

Figure 6B:
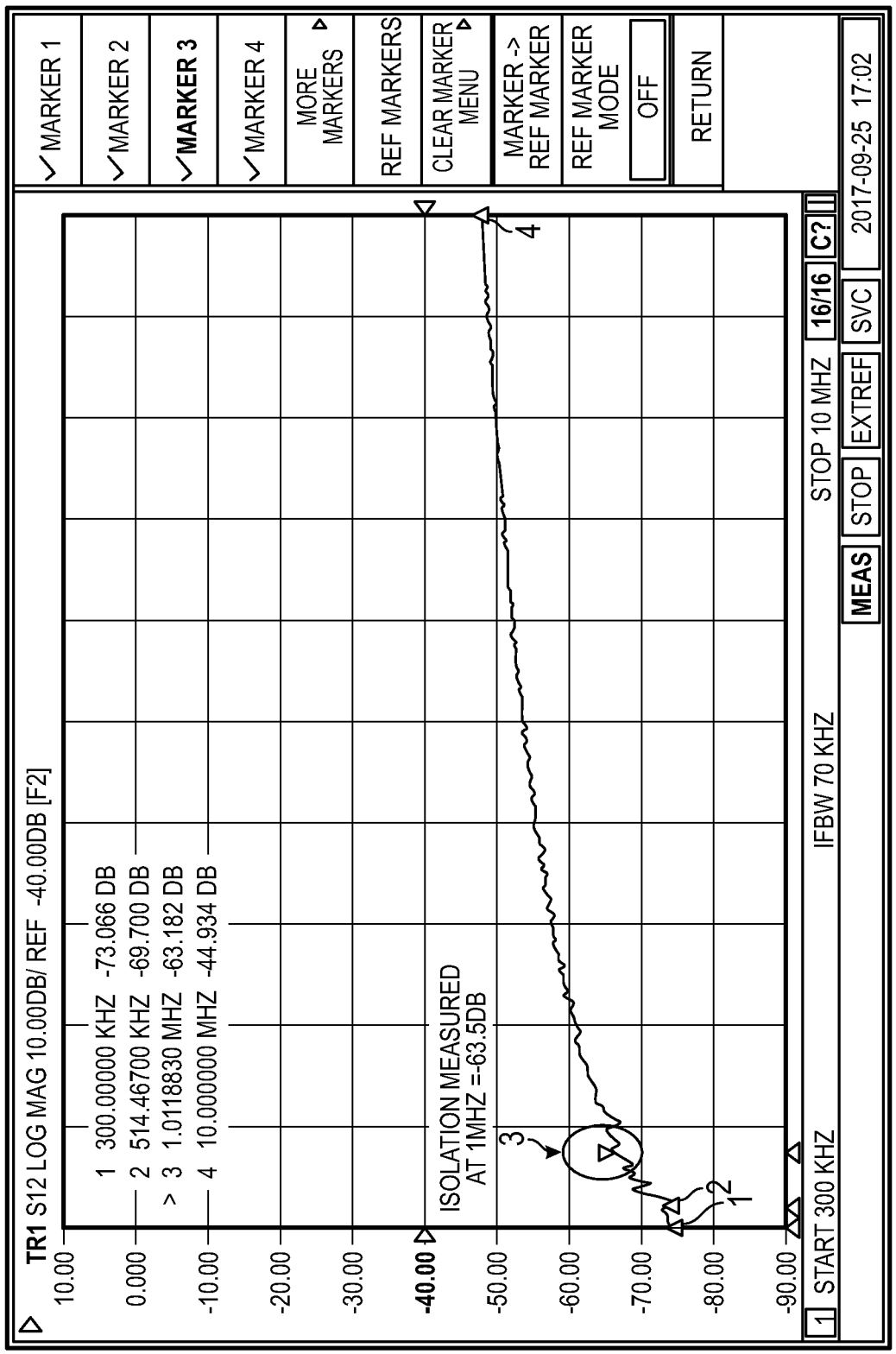
FIG. 6B is a graph illustrating results of the tests of FIG. 6A according to an embodiment.

FIG. 6B is a graph illustrating results of the tests of FIG. 6A according to an embodiment. Note the isolation measured at 1 MHz was −63.5 decibel (DB), which exhibits high off-switch isolation. Other measurements are illustrated inset within the graph of FIG. 5B.

Figure 7:
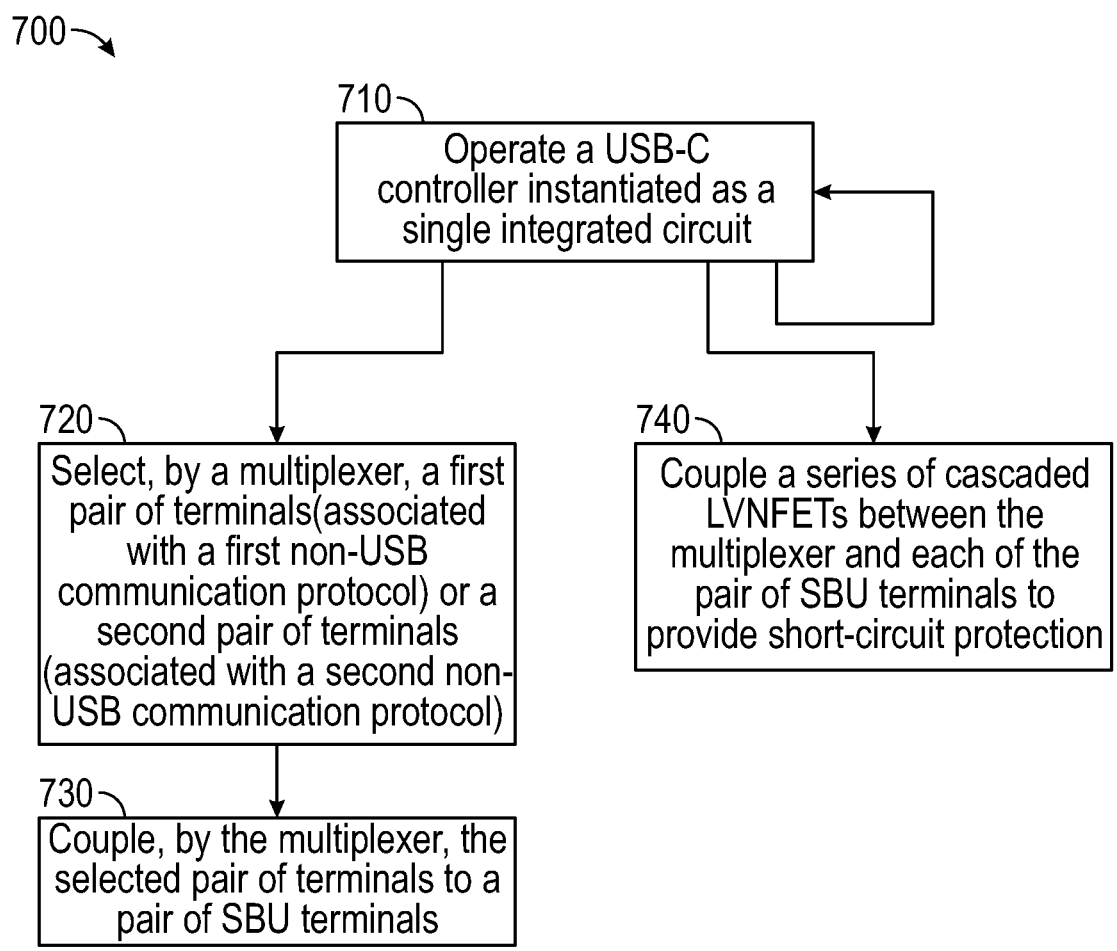
FIG. 7 is a flow chart for a method of designing a USB-C controller to form a type-C sideband interface circuit according to one embodiment.

FIG. 7 is a flow chart for a method of designing a USB-C controller to form a type-C sideband interface circuit according to one embodiment. The method 700 may be performed by processing logic that comprises hardware (e.g., circuitry, dedicated logic, programmable logic, microcode, etc.). In some embodiments, the method 700 is performed wholly or in part by one of the USB-C controllers discussed herein.

In various embodiments, the method 700 may begin by operating a USB-C controller instantiated as a first integrated circuit, wherein the USB-C controller comprises a multiplexer, a series of cascaded, low-voltage n-type field-effect transistors (LVNFETs), a first pair of terminals, a second pair of terminals, and a pair of sideband use (SBU) terminals (710). The operating USB-C controller may be performed as illustrated in any of blocks 720, 730, and/or 740. For example, the method 700 may continue with selecting, by the multiplexer, the first pair of terminals (associated with a first non-USB communication protocol) or a second pair of terminal (associated with a second non-USB communication protocol) (720). The method 700 may continue with coupling, by the multiplexer, the selected pair of terminals to the pair of SBU terminals (730). The selecting and coupling by the multiplexer of the selected pair of terminals to the pair of SBU terminals may be performed in response to, or after, connection orientation is determined based on CC signal(s) on the CC channel of the USB-C controller.

With additional reference to FIG. 7, the method 700 may continue with coupling the series of cascaded (LVNFETs) between the multiplexer and each of the pair of SBU terminals to provide short-circuit protection (740). The short circuit protection may be provided in response to detecting a short between an adjacent VBUS terminal and one of the pair of SBU terminals.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A Universal Serial Bus Type-C (USB-C) controller comprising:
    a first pair of terminals to communicate over a first communication protocol that is other than a Universal Serial Bus (USB) protocol;
    a second pair of terminals to communicate over a second communication protocol that is other than the USB protocol;
    a third pair of terminals, each of which is to be coupled to a corresponding SBU1 terminal or SBU2 terminal of a Type-C receptacle;
    a multiplexer to selectively couple the first pair of terminals to the third pair of terminals and the second pair of terminals to the third pair of terminals, wherein the multiplexer comprises a first set of four low-voltage (LV) transistors to selectively couple each terminal of the first pair of terminals to one of the third pair of terminals; and
    first logic to control gates of each of the first set of four LV transistors according to a mode enabled within a configuration channel (CC) signal;
    wherein the USB-C controller is disposed on an integrated circuit (IC).

2. The USB-C controller of claim 1, wherein the multiplexer further comprises a second set of four LV transistors to selectively couple each terminal of the second pair of terminals to the third pair of terminals.

3. The USB-C controller of claim 1, wherein at least one of the first communication protocol and the second communication protocol is one of a DisplayPort (DP) protocol, a high-definition multimedia interface (HDMI) protocol, a Thunderbolt® (TBT) protocol, a mobile high-definition link (MHL) protocol, and a Peripheral Component Interconnect Express (PCIe) protocol.

4. The USB-C controller of claim 1, further comprising a series of cascaded LV transistors coupled between the multiplexer and each terminal of the third pair of terminals.

5. The USB-C controller of claim 4, wherein the series of cascaded LV transistors comprises five-volt LV transistors.

6. The USB-C controller of claim 1, wherein the USB-C controller is configured to provide at least 20 volts of short-circuit protection on the third pair of terminals.

7. The USB-C controller of claim 1, wherein the first pair of terminals comprises a LSTX control terminal and a LSRX control terminal of a Thunderbolt® (TBT) protocol.

8. The USB-C controller of claim 1, wherein the second pair of terminals comprises a positive auxiliary control terminal and a negative auxiliary control terminal of a DisplayPort (DP) protocol.

9. The USB-C controller of claim 1, wherein the USB-C controller is further configured to provide flip correction in response to the CC signal, when the first pair of terminals or the second pair of terminals is coupled to the third pair of terminals.

10. The USB-C controller of claim 1, wherein the USB-C controller further comprises at least one of:
    a 20V IEC RC snapback clamp coupled between each of the third pair of terminals and ground; and
    a human body model (HBM) snapback clamp coupled between each of the first pair of terminals and ground.

11. A system comprising:
    a first host controller to communicate over a first communication protocol that is other than a Universal Serial Bus (USB) protocol;
    a second host controller to communicate over a second communication protocol that is other than the USB protocol;

a USB Type-C receptacle; and
a USB Type-C (USB-C) controller disposed on an integrated circuit (IC), the USB-C controller comprising:
- a first pair of terminals coupled to the first host controller;
- a second pair of terminals coupled to the second host controller;
- a third pair of terminals, each of which is coupled to a corresponding SBU1 terminal or SBU2 terminal of the USB Type-C receptacle;
- a multiplexer to selectively couple the first pair of terminals to the third pair of terminals and the second pair of terminals to the third pair of terminals, wherein the multiplexer comprises a first set of four low-voltage (LV) transistors to selectively couple each terminal of the first pair of terminals to one of the third pair of terminals; and
- first logic to control gates of each of the first set of four LV transistors according to a mode enabled within a configuration channel (CC) signal.

12. The system of claim 11, wherein the multiplexer further comprises a second set of four LV transistors to selectively couple each terminal of the second pair of terminals to the third pair of terminals.

13. The system of claim 11, wherein at least one of the first communication protocol and the second communication protocol is one of a DisplayPort (DP) protocol, a high-definition multimedia interface (HDMI) protocol, a Thunderbolt® (TBT) protocol, a mobile high-definition link (MHL) protocol, and a Peripheral Component Interconnect Express (PCIe) protocol.

14. The system of claim 11, further comprising a series of cascaded LV transistors coupled between the multiplexer and each terminal of the third pair of terminals.

15. The system of claim 14, wherein the series of cascaded LV transistors comprises five-volt LV transistors.

16. The system of claim 11, wherein the USB-C controller is configured to provide at least 20 volts of short-circuit protection on the third pair of terminals.

17. The system of claim 11, wherein the first pair of terminals comprises a LSTX control terminal and a LSRX control terminal of a Thunderbolt® (TBT) protocol.

18. The system of claim 11, wherein the second pair of terminals comprises a positive auxiliary control terminal and a negative auxiliary control terminal of a DisplayPort (DP) protocol.

19. The system of claim 11, wherein the USB-C controller is further configured to provide flip correction in response to the CC signal, when the first pair of terminals or the second pair of terminals is coupled to the third pair of terminals.

20. The system of claim 11, wherein the USB-C controller further comprises at least one of:
- a 20V IEC RC snapback clamp coupled between each of the third pair of terminals and ground; and
- a human body model (HBM) snapback clamp coupled between each of the first pair of terminals and ground.

* * * * *